(12) United States Patent
Holley et al.

(10) Patent No.: US 11,987,377 B2
(45) Date of Patent: May 21, 2024

(54) TURBO EXPANDERS FOR TURBINE ENGINES HAVING HYDROGEN FUEL SYSTEMS

(71) Applicant: RTX Corporation, Farmington, CT (US)

(72) Inventors: Brian M. Holley, Eastford, CT (US); Joseph B. Staubach, Colchester, CT (US); Marc J. Muldoon, Marlborough, CT (US); Charles E. Lents, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/860,746

(22) Filed: Jul. 8, 2022

(65) Prior Publication Data

US 2024/0010351 A1 Jan. 11, 2024

(51) Int. Cl.
*B64D 37/30* (2006.01)
*B64D 15/12* (2006.01)
(Continued)

(52) U.S. Cl.
CPC ............. *B64D 37/30* (2013.01); *B64D 15/12* (2013.01); *B64D 41/00* (2013.01); *F02C 3/22* (2013.01);
(Continued)

(58) Field of Classification Search
CPC .... F02C 3/22; F02C 7/224; F02C 7/36; F02C 7/12; F02C 9/40; F05D 2260/213;
(Continued)

(56) References Cited

U.S. PATENT DOCUMENTS 3,237,400 A 3/1966 Kuhrt
3,237,401 A 3/1966 Peters et al.
(Continued)

FOREIGN PATENT DOCUMENTS

CN 108750123 B 10/2020
EP 2643579 B1 * 9/2014 ............... F02K 3/00
(Continued)

OTHER PUBLICATIONS

Simon, et al.; "Joint Cryogentic Engine Stucy"; Int. J. Hydrogen Energy; vol. 19, No. 7; pp. 617-623; 7 pages; (1994).
(Continued)

*Primary Examiner* — Craig Kim
(74) *Attorney, Agent, or Firm* — CANTOR COLBURN LLP

(57) ABSTRACT

Aircraft propulsion systems include aircraft systems having at least one hydrogen tank and an aircraft-systems heat exchanger and engine systems having at least a main engine core, a high pressure pump, a hydrogen-air heat exchanger, and a turbo expander. The main engine core includes a compressor section, a combustor section having a burner, and a turbine section. Hydrogen is supplied from the at least one hydrogen tank through a hydrogen flow path, passing through the aircraft-systems heat exchanger, the high pressure pump, the hydrogen-air heat exchanger, and the turbo expander, prior to being injected into the burner for combustion. The turbo expander includes a rotor separated into a first expander portion and a second expander portion arranged about an output shaft and the output shaft is operably connected to a generator configured to generate electrical power.

20 Claims, 9 Drawing Sheets

(51) Int. Cl.
  *B64D 41/00* (2006.01)
  *F02C 3/22* (2006.01)
  *F02C 7/32* (2006.01)
(52) U.S. Cl.
  CPC .......... *F02C 7/32* (2013.01); *F05D 2220/323* (2013.01); *F05D 2220/76* (2013.01)
(58) Field of Classification Search
  CPC . F05D 2220/76; F05D 2240/35; B64D 13/06; B64D 37/30; B64D 37/34
  See application file for complete search history.

(56) References Cited

U.S. PATENT DOCUMENTS

| | | | |
|---|---|---|---|
| 3,241,311 A | 3/1966 | Kuhrt | |
| 3,452,541 A | 7/1969 | Builder | |
| 3,616,779 A | 11/1971 | Newkirk | |
| 4,272,953 A | 6/1981 | Rice | |
| 5,163,285 A | 11/1992 | Mazeaud et al. | |
| 5,363,641 A | 11/1994 | Dixon et al. | |
| 5,392,595 A | 2/1995 | Glickstein et al. | |
| 5,924,307 A * | 7/1999 | Nenov | F25J 3/04133 62/643 |
| 7,208,239 B2 | 4/2007 | Hoffjann et al. | |
| 7,555,893 B2 | 7/2009 | Okai et al. | |
| 8,049,353 B1 | 11/2011 | Eng et al. | |
| 9,932,124 B2 | 4/2018 | Kamath et al. | |
| 10,125,692 B2 | 11/2018 | Ernst | |
| 10,989,117 B2 | 4/2021 | Roberge | |
| 11,434,823 B2 | 9/2022 | Roberge | |
| 11,603,798 B1 | 3/2023 | Terwilliger et al. | |
| 11,661,889 B1 * | 5/2023 | Muldoon | F02C 3/22 415/116 |
| 11,708,766 B2 * | 7/2023 | Angel | F02C 3/22 60/647 |
| 11,773,782 B2 | 10/2023 | Johnson et al. | |
| 2006/0185347 A1 | 8/2006 | Knapp | |
| 2006/0222919 A1 | 10/2006 | Tanaka et al. | |
| 2008/0028765 A1 * | 2/2008 | Bartlett | F02C 3/22 60/39.182 |
| 2014/0230778 A1 | 8/2014 | Grannell et al. | |
| 2014/0300109 A1 * | 10/2014 | Palmer | F04D 5/002 415/55.1 |
| 2014/0301826 A1 * | 10/2014 | Palmer | F01D 1/12 415/55.1 |
| 2015/0033792 A1 * | 2/2015 | Lissianski | F25J 1/0052 62/611 |
| 2015/0337730 A1 | 11/2015 | Kupiszewski et al. | |
| 2016/0123226 A1 | 5/2016 | Razak et al. | |
| 2018/0112142 A1 * | 4/2018 | Foody | C10L 3/105 |
| 2019/0063257 A1 * | 2/2019 | Fioravanti | F01D 25/125 |
| 2019/0162121 A1 | 5/2019 | Staubach et al. | |
| 2020/0040848 A1 | 2/2020 | Hanrahan et al. | |
| 2020/0088099 A1 | 3/2020 | Roberge | |
| 2020/0088102 A1 | 3/2020 | Roberge | |
| 2020/0400372 A1 * | 12/2020 | Castellucci | F02C 6/16 |
| 2021/0047970 A1 | 2/2021 | Collopy et al. | |
| 2021/0293243 A1 * | 9/2021 | Ghezzi | C07C 5/333 |
| 2021/0332759 A1 * | 10/2021 | Smith | F02C 7/224 |
| 2021/0340908 A1 * | 11/2021 | Boucher | F02C 3/22 |
| 2021/0348561 A1 * | 11/2021 | Cocks | F02C 7/12 |
| 2021/0370223 A1 * | 12/2021 | Stuckert | B01J 20/3483 |
| 2022/0099299 A1 | 3/2022 | Carrotte et al. | |
| 2022/0195928 A1 | 6/2022 | Johnson et al. | |
| 2022/0221220 A1 * | 7/2022 | Thomas | F25J 1/021 |
| 2022/0243667 A1 * | 8/2022 | Rambo | F02C 6/003 |
| 2022/0297844 A1 | 9/2022 | Mackin et al. | |
| 2022/0299205 A1 * | 9/2022 | MacDonald | F02C 3/20 |
| 2022/0364513 A1 | 11/2022 | Muldoon et al. | |
| 2022/0376280 A1 | 11/2022 | Shao et al. | |
| 2023/0010158 A1 | 1/2023 | Muldoon et al. | |
| 2023/0011956 A1 * | 1/2023 | Wiedenhoefer | F02C 7/185 |
| 2023/0056536 A1 * | 2/2023 | Boucher | F02C 1/10 |
| 2023/0080053 A1 * | 3/2023 | Emerson | B64D 37/34 62/401 |
| 2023/0092811 A1 | 3/2023 | Palmer | |
| 2023/0237208 A1 * | 7/2023 | Malisani | F03D 13/30 703/18 |
| 2023/0250754 A1 * | 8/2023 | Muldoon | F02C 9/40 60/39.465 |
| 2023/0304439 A1 | 9/2023 | Holley et al. | |
| 2024/0010352 A1 | 1/2024 | Holley et al. | |

FOREIGN PATENT DOCUMENTS

| | | | | |
|---|---|---|---|---|
| EP | 3855002 A2 | 7/2021 | | |
| EP | 3904658 A1 | 11/2021 | | |
| EP | 3907387 A1 * | 11/2021 | ............... | F02C 3/22 |
| EP | 4019752 A1 | 6/2022 | | |
| EP | 4089271 A1 | 11/2022 | | |
| FR | 2967725 A1 * | 5/2012 | ............... | F02K 3/00 |

OTHER PUBLICATIONS

Schmittz, O et al., "Aero Engine Concepts Beyond 2030: Part 1—The Steam Injecting and Recovering Aero Engine", Proceedings of ASME Turbo Expo 2020 Turbomachinery Technical Conference and Exposition GT2020, Sep. 21-25, 2020, Virtual, Online, 12 pages.

Schmitz, O. et al., "Aero Engine Concepts Beyond 2030: Part 3—Experimental Demonstration of Technological Feasbility" Proceedings of ASME Turbo Expo 2020 Turbomachinery Technical Conference and Exposition GT2020 Sep. 21-25, 2020, 12 pages.

* cited by examiner

TURBO EXPANDERS FOR TURBINE ENGINES HAVING HYDROGEN FUEL SYSTEMS

TECHNICAL FIELD

The present disclosure relates generally to turbine engines and aircraft engines, and more specifically to turbo expanders for use when employing hydrogen fuel systems and related systems with turbine and aircraft engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, aircraft propulsion systems are provided. The aircraft propulsion systems include aircraft systems comprising at least one hydrogen tank and an aircraft-systems heat exchanger and engine systems comprising at least a main engine core, a high pressure pump, a hydrogen-air heat exchanger, and a turbo expander, wherein the main engine core comprises a compressor section, a combustor section having a burner, and a turbine section. Hydrogen is supplied from the at least one hydrogen tank through a hydrogen flow path, passing through the aircraft-systems heat exchanger, the high pressure pump, the hydrogen-air heat exchanger, and the turbo expander, prior to being injected into the burner for combustion. The turbo expander includes a rotor separated into a first expander portion and a second expander portion arranged about an output shaft, and the output shaft is operably connected to a generator configured to generate electrical power.

In addition to one or more of the features described above, or as an alternative, embodiments of the aircraft propulsion systems may include that the first expander portion of the rotor includes at least five blade rows and the second expander portion of the rotor includes at least seven blade row.

In addition to one or more of the features described above, or as an alternative, embodiments of the aircraft propulsion systems may include a gear box operably coupled between the output shaft and the generator.

In addition to one or more of the features described above, or as an alternative, embodiments of the aircraft propulsion systems may include that the generator is configured to generate at least 1 MW of electrical power.

In addition to one or more of the features described above, or as an alternative, embodiments of the aircraft propulsion systems may include a secondary tank configured to contain a secondary fluid that is supplied to the turbo expander and configured to provide at least one of seal buffering and starting flow for the turbo expander.

In addition to one or more of the features described above, or as an alternative, embodiments of the aircraft propulsion systems may include that the secondary tank contains high pressure gaseous hydrogen.

In addition to one or more of the features described above, or as an alternative, embodiments of the aircraft propulsion systems may include that electrical power from the generator is supplied to a wing anti-ice system.

In addition to one or more of the features described above, or as an alternative, embodiments of the aircraft propulsion systems may include that the turbo expander is a radial inflow turbo expander.

In addition to one or more of the features described above, or as an alternative, embodiments of the aircraft propulsion systems may include that the turbo expander is an axial inflow turbo expander.

In addition to one or more of the features described above, or as an alternative, embodiments of the aircraft propulsion systems may include that a flow through the first expander portion is in a first direction and a flow through the second expander portion is in a second direction opposite the flow through the first expander portion.

According to some embodiments, aircraft are provided. The aircraft include a main engine core having a compressor section, a combustor section having a burner, a turbine section, and a turbo expander and aircraft systems comprising at least one hydrogen tank and an aircraft-systems heat exchanger arranged remote from the main engine core. Hydrogen is supplied from the at least one hydrogen tank through a hydrogen flow path, passing through the aircraft-systems heat exchanger and the turbo expander prior to being injected into the burner for combustion. The turbo expander comprises a rotor separated into a first expander portion and a second expander portion arranged about an output shaft, and the output shaft is operably connected to a generator configured to generate electrical power.

In addition to one or more of the features described above, or as an alternative, embodiments of the aircraft may include a gear box operably coupled between the output shaft and the generator.

In addition to one or more of the features described above, or as an alternative, embodiments of the aircraft may include that the generator is configured to generate at least 1 MW of electrical power.

In addition to one or more of the features described above, or as an alternative, embodiments of the aircraft may include a secondary tank configured to contain a secondary fluid that is supplied to the turbo expander and configured to provide at least one of seal buffering and starting flow for the turbo expander.

In addition to one or more of the features described above, or as an alternative, embodiments of the aircraft may include that the secondary tank contains high pressure gaseous hydrogen.

In addition to one or more of the features described above, or as an alternative, embodiments of the aircraft may include that electrical power from the generator is supplied to a wing anti-ice system of the aircraft.

In addition to one or more of the features described above, or as an alternative, embodiments of the aircraft may include that the turbo expander is a radial inflow turbo expander.

In addition to one or more of the features described above, or as an alternative, embodiments of the aircraft may include that the turbo expander is an axial inflow turbo expander.

In addition to one or more of the features described above, or as an alternative, embodiments of the aircraft may include that a flow through the first expander portion is in a first direction and a flow through the second expander portion is in a second direction opposite the flow through the first expander portion.

In addition to one or more of the features described above, or as an alternative, embodiments of the aircraft may include that the first expander portion of the rotor includes at least five blade rows and the second expander portion of the rotor includes at least seven blade rows.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
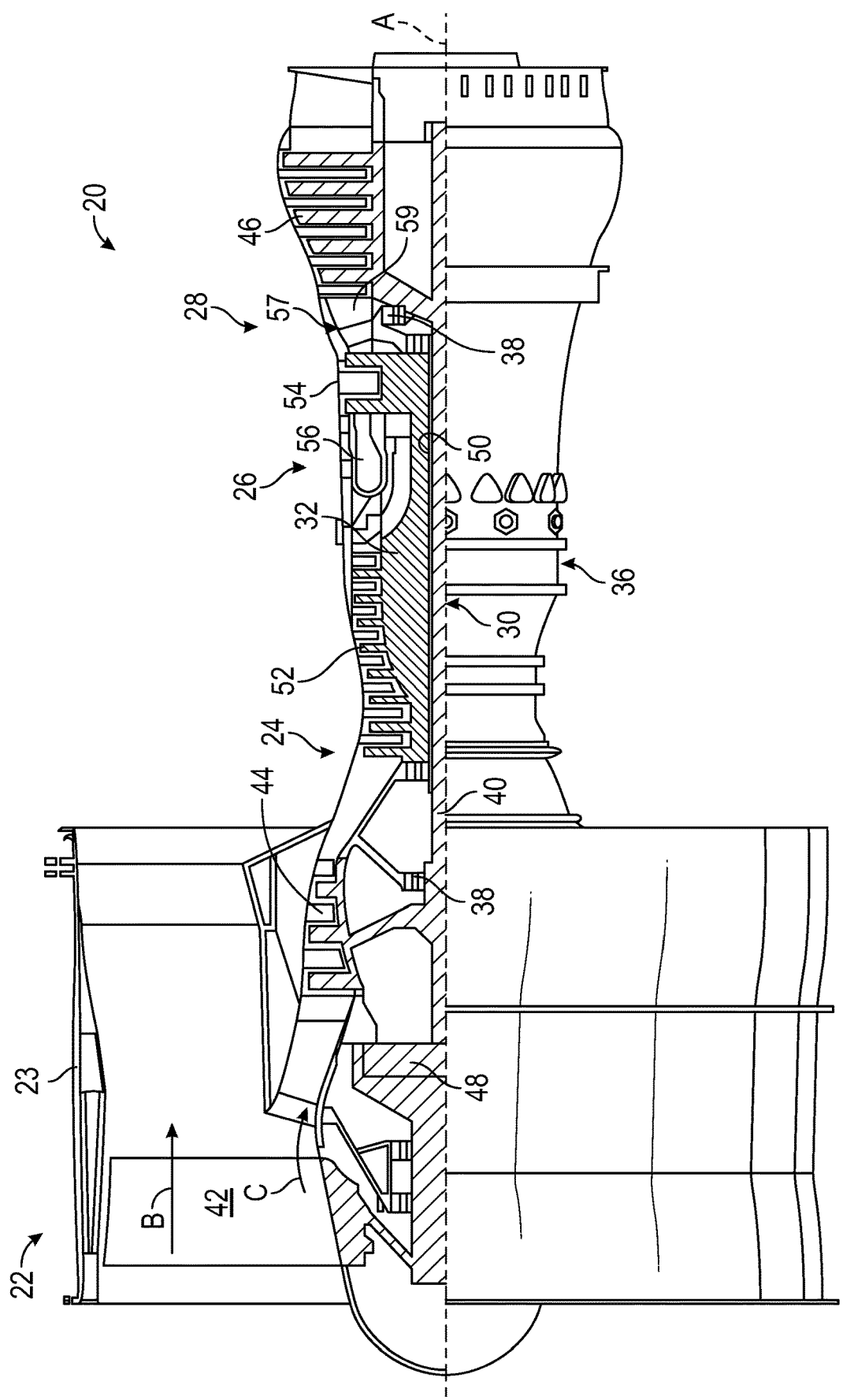
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 23. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may be significant advantages, as described herein.

Figure 2:
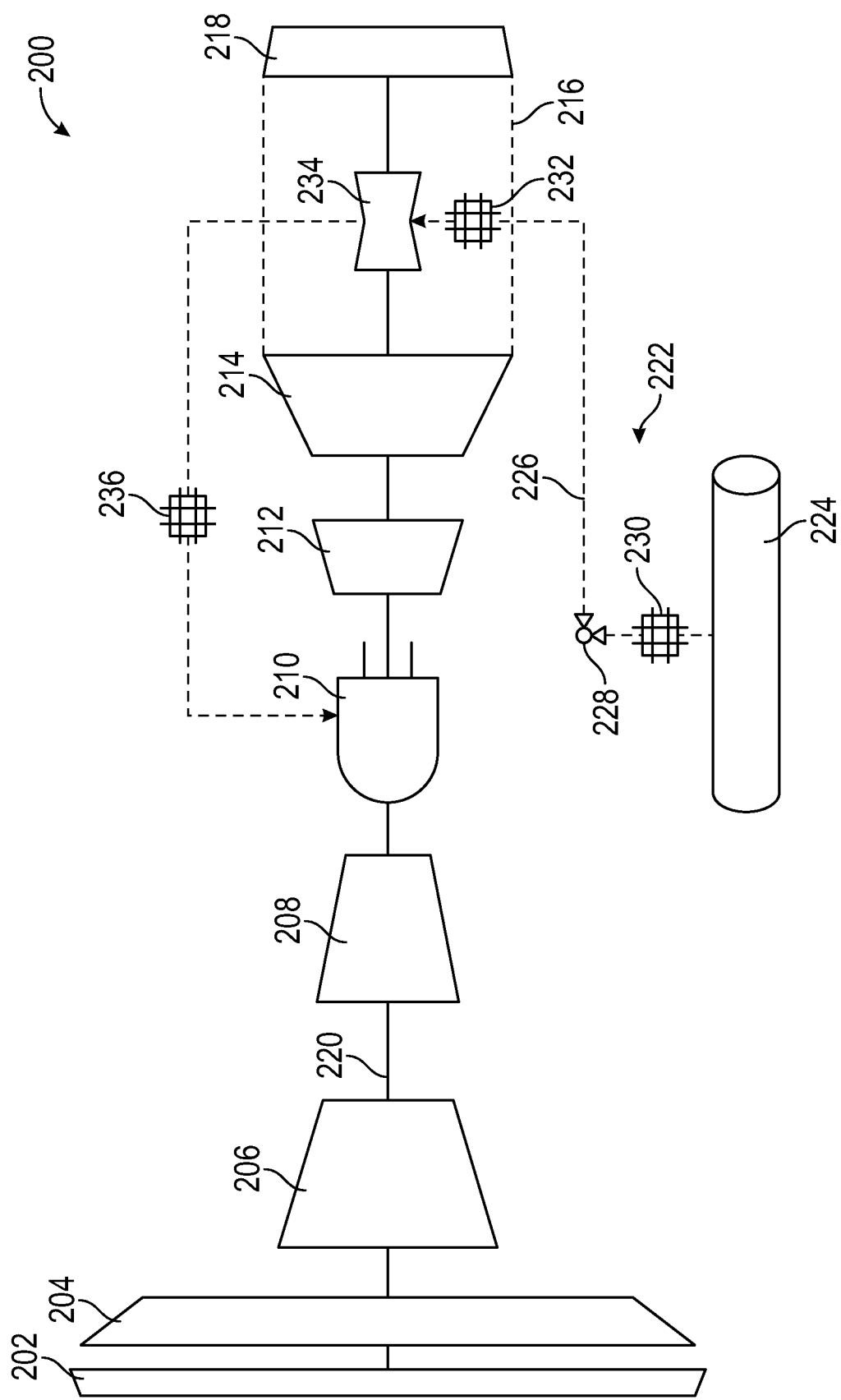
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206, 208, the turbine 212, 214, and the combustor sections 210. The compressor 206, 208, the turbine 212, 214, and the fan 204 are arranged along a shaft 220.

As shown, the turbine engine system 200 includes a hydrogen fuel system 222. The hydrogen fuel system 222 is configured to supply a hydrogen fuel from a hydrogen fuel tank 224 to the combustor 210 for combustion thereof. In this illustrative embodiment, the hydrogen fuel may be supplied from the hydrogen fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can be configured to provide cooling to various systems onboard an aircraft by using the hydrogen as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the hydrogen fuel tank 224 as a first working fluid and a component-working fluid for a different onboard system. For example, the heat exchanger 230 may be configured to provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump or other means to increase a pressure of the hydrogen sourced from the hydrogen fuel tank 224 may be arranged upstream of the heat exchanger 230. This pumping or pressure increase may be provided to pump the hydrogen to high pressure as a liquid (low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchangers. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and as the second working fluid may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors, as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Because the hydrogen is heated from a cryogenic or liquid state in the hydrogen fuel tank 224 through the various mechanisms along the flow supply line 226, engine thermal efficiency may be improved.

Figure 3:
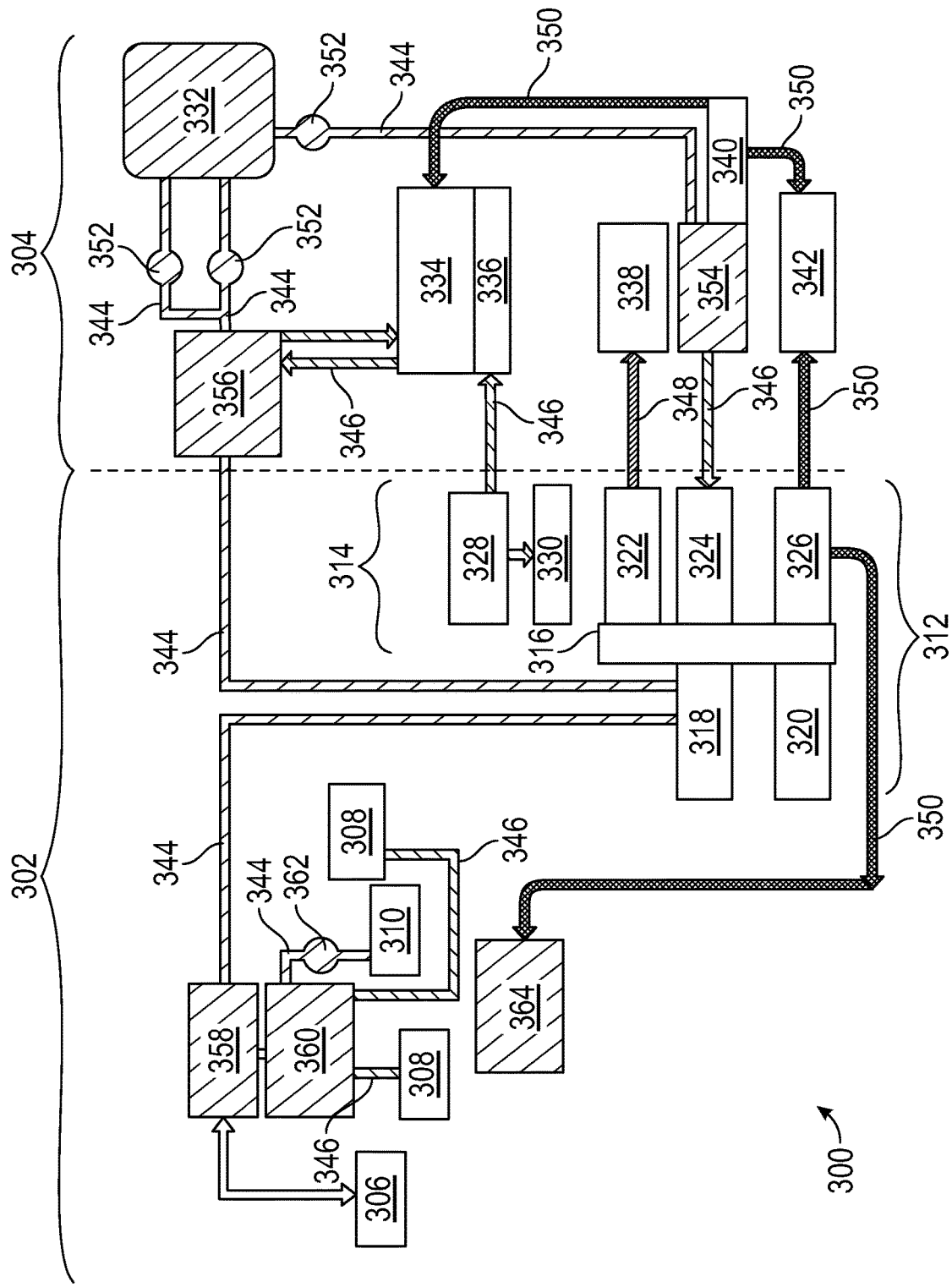
FIG. 3 is a schematic diagram of an aircraft propulsion system in accordance with an embodiment of the present disclosure.

Turning now to FIG. 3, a schematic diagram of an aircraft propulsion system 300 is shown. The aircraft propulsion system 300 includes engine systems 302 and aircraft systems 304. In accordance with embodiments of the present disclosure, the engine systems 302 include components, devices, and systems that are part of an aircraft engine, which may be wing-mounted or fuselage-mounted and the aircraft systems 304 are components, devices, and systems that are located separately from the engine, and thus may be arranged within various locations on a wing, within a fuselage, or otherwise located onboard an aircraft.

The engine systems 302 may include the components shown and described above, including, without limitation, a fan section, a compressor section, a combustor section, a turbine section, and an exhaust section. In this schematic illustration, without limitation, the engine systems 302 include an engine oil system 306, an air cooling system 308, a burner 310 (e.g., part of a combustion section), a gear box system 312, and an anti-ice system 314. Those of skill in the art will appreciate that other systems, components, and devices may be incorporated into the engine system 302, and the illustrative embodiment is merely for explanatory and illustrative purposes. The gear box system 312, as shown, includes a main gear box 316 with various components operably connected thereto. In this illustrative embodiment, a hydrogen high pressure pump 318, an oil pump 320, a hydraulic pump 322, an air turbine starter 324, and a generator 326 may all be operably connected to the main gear box 316 of the gear box system 312. The anti-ice system 314 of the engine systems 302 includes an engine bleed system 328 that is configured to supply warm air to a cowl anti-ice system 330 to prevent ice buildup on an engine cowl.

The aircraft systems 304 include various features installed and present that are separate from but may be operably or otherwise connected to one or more of the engine systems 302. In this illustrative, non-limiting configuration, the aircraft systems 304 include one or more hydrogen tanks 332 configured to store liquid hydrogen onboard the aircraft, such as in tanks that are wing-mounted or arranged within the aircraft fuselage. The aircraft systems 304 include a cabin air cooling system 334, a wing anti-ice system 336, flight controls 338, one or more generators 340, and aircraft power systems 342.

The schematic diagram in FIG. 3 of the aircraft propulsion system 300 illustrates flow paths for different working fluids. For example, a hydrogen flow path 344 represents a flow path of liquid (or gaseous or supercritical) hydrogen from the hydrogen tanks 332 to the burner 310. One or more air flow paths 346 represent airflow used for cooling and heat exchange with the hydrogen, and thus one or more heat exchangers or exchange systems may be provided to enable heat transfer from the air to the hydrogen, to cool the air and warm the hydrogen. A hydraulic fluid flow path 348 is illustrated fluidly connecting the hydraulic pump 322 to the flight controls 338. An electrical path 350 illustrates power generated by the generator 326 and distribution of such power (e.g., from generators 326, 340 to aircraft power systems 342 and other electrical systems onboard an aircraft). As shown, one or more of the paths 344, 346, 348, 350 may cross between the engine systems 302 and the aircraft systems 304.

Referring to the hydrogen flow path 344, hydrogen may be sourced or supplied from the hydrogen tanks 332. One or more pumps 352 may be arranged to boost a pressure of the hydrogen as it is supplied from the hydrogen tanks 332. In some configurations, the pumps 352 may be low pressure pumps, providing an increase in pressure of about 20 psid to 50 psid, for example. The hydrogen may be supplied to one or more combustion systems. For example, a portion of the hydrogen may be supplied to an auxiliary power source 354, such as an auxiliary power unit having a burner or a fuel cell. The auxiliary power source 354 may be configured to direct air to the air turbine starter 324 along a leg of an air flow path 346. Further, this auxiliary power source 354 may be configured to generate power at the generator 340 to supply power to the aircraft power system 342 and/or the cabin air cooling system 334 and other ECS systems.

For propulsion onboard the aircraft, a portion of the hydrogen may be supplied from the hydrogen tanks 332 along the hydrogen flow path 344 to a first heat exchanger 356 which may include a hydrogen-air heat exchanger to cool air. One or more low pressure pumps 352 may be arranged to boost a pressure and thus heat the hydrogen before entering the first heat exchanger 356. The first heat exchanger 356 may be part of an environmental control system (ECS) of the aircraft. The cooled air may be supplied, for example, to the cabin air cooling system 334. As this air is cooled, the hydrogen will be warmed within the first heat exchanger 356. The warmed hydrogen may then be passed through the hydrogen high pressure pump 318 which may further increase the pressure of the warmed hydrogen to maintain a pressure above a combustor pressure and/or above a critical pressure in order to avoid a phase change to gas in the plumbing, piping, flow path, or heat exchangers, for example.

The boosted pressure hydrogen may then be conveyed to a second heat exchanger 358. The second heat exchanger 358 may be a hydrogen-oil heat exchanger to cool engine oil of the engine systems 302. As such, the second heat exchanger 358 may be part of a closed loop of the engine oil system 306. In the second heat exchanger 358, the temperature of the hydrogen is further raised. Next, the hydrogen may be passed through a third heat exchanger 360. The third heat exchanger 360 may be a hydrogen-air heat exchanger. The third heat exchanger 360 may be part of an engine cooling system to supply air from one section of the engine systems 302 to another part of the engine systems 302 (e.g., from compressor section to turbine section, or from turbine section to compressor section). The cooled air generated in the third heat exchanger 360 may be used for cooling air (e.g., for a turbine) and/or for buffer air within compartments of the engine systems 302. The third heat exchanger 360 may thus use warm engine air for heating the hydrogen, but also cooling such air for air-cooling schemes of the engine systems 302. A valve 362 may be arranged to control a flow of the heated hydrogen into the burner 310. In some embodiments, and as shown, an electric compressor actuator 364 may be included within the engine systems 302. The electric compressor actuator 364 may be configured to boost a pressure of the hydrogen prior to injection into the burner 310.

Using the architecture illustrated in FIG. 3, and in accordance with embodiments of the present disclosure, the hydrogen may be used as a heat sink to provide increased cooling capacity as compared to other cooling schemes. For Example, using liquid, gaseous, or supercritical hydrogen can, in some configurations, provide up to ten times the cooling capacity of prior systems. The hydrogen may be used at various locations along the hydrogen flow path 344 to provide cooling to one or more systems, as noted above. For example, the hydrogen can provide cooling to onboard electronics, generators, air for cooling purposes, etc. The pumps 318, 352 act to increase the pressure of the hydrogen. Use of low pressure pumps (e.g., pumps 352) can allow cooling of cooler heat sources at lower pressure (e.g., onboard electronics), whereas a high pressure pump (e.g., pump 318) can be used for higher pressure heat sources (e.g., generators 326, 340). Further, because the hydrogen is low temperature at the first heat exchanger 356, the hydrogen may act as an efficient heat sink for air. As such, the cabin air conditioning system 334 and other aspects of onboard ECS can be reduced in size, weight, and complexity.

It will be appreciated that the aircraft propulsion system 300 is an air breathing system. That is, the combustion of the hydrogen within the burner 310 is a mixture of pure hydrogen supplied from the hydrogen tanks 332 into the burner 310 where it is combusted in the presence of air pulled into the engine through a fan or the like. The aircraft propulsion system 300 may be substantially similar in construction and arrangement to a hydrocarbon-burning system (e.g., convention gas turbine engine) that burns, for example, jet fuel. The turbine of the aircraft propulsion system 300 is thus driven by an output of the burner, similar to a convention gas turbine engine. Because the aircraft propulsion system 300 is an air-breathing system that relies upon combustion, a flow rate of the hydrogen into the burner 310, as controlled in part by the valve 362, may be relatively low (e.g., around 0.2 pounds per second at cruise or around 0.025 pounds per second at minimum idle).

As described herein, aircraft propulsion systems are described that include a main engine core and a hydrogen fuel source, with the main engine core configured to burn the hydrogen to drive rotation of components of the main engine core. For example, the main engine core can include, at least, a compressor section, a combustor section, and a turbine. The main engine core is air breathing, and the combustor section is configured to burn a mixture of hydrogen (sourced from onboard hydrogen tanks) and air. The combustion output is used to drive rotation of the turbine section, which in turn drives rotation of the compressor section. As such, in view of the above description, the engine systems described with respect to FIG. 3 may be considered part of or components of the main engine core. Separate, yet connected, systems are part of the aircraft systems, which are remote from the engine systems. As described above, the engine systems may be wing mounted or fuselage installed, whereas the aircraft systems may be distributed about all other aspects of an aircraft (e.g., wings, cabins, cockpit, fuselage, etc.).

Figure 4:
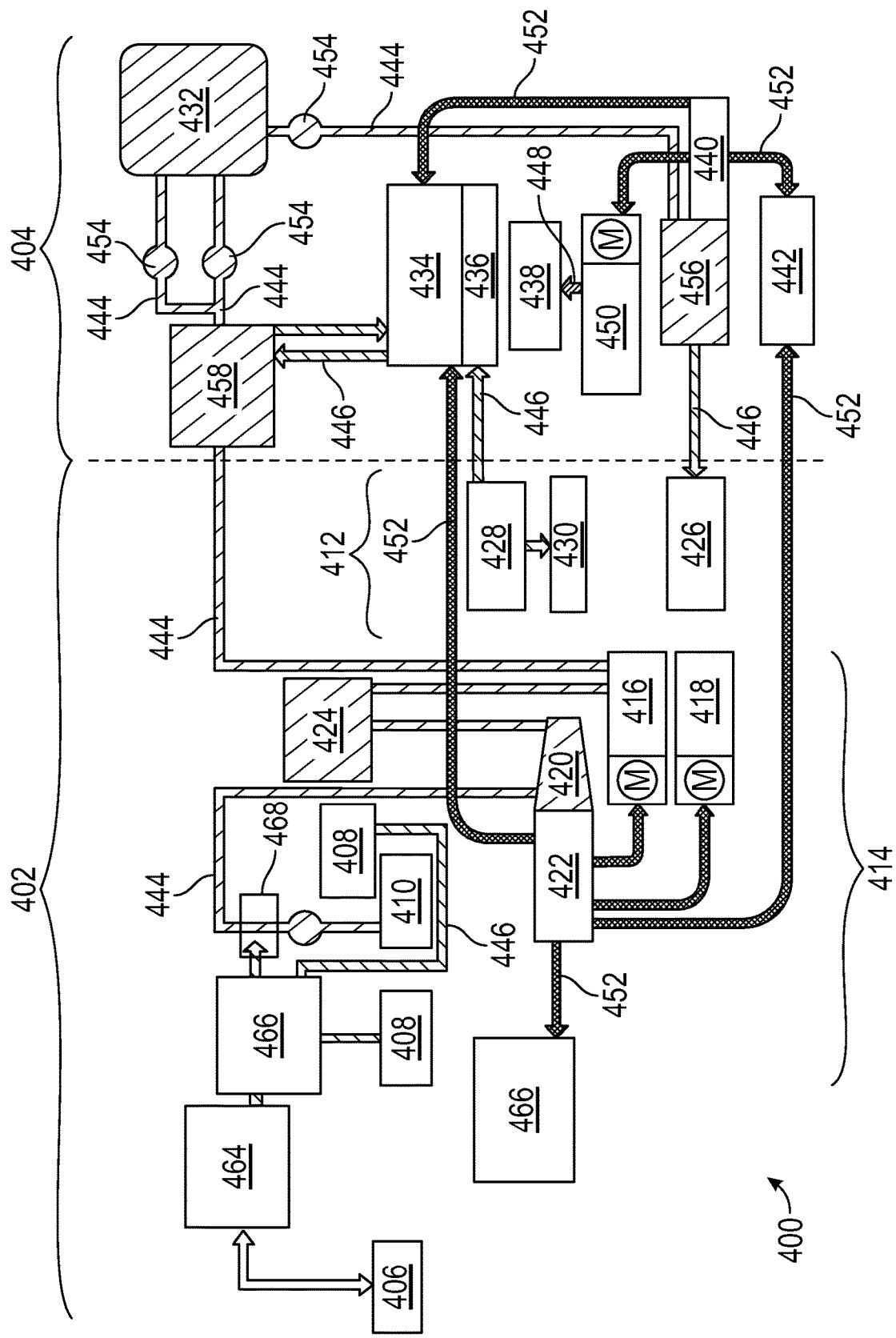
FIG. 4 is a schematic diagram of an aircraft propulsion system in accordance with an embodiment of the present disclosure.

Turning now to FIG. 4, a schematic diagram of an aircraft propulsion system 400 is shown. The aircraft propulsion system 400 includes engine systems 402 and aircraft systems 404. In accordance with embodiments of the present disclosure, the engine systems 402 include components, devices, and systems that are part of an aircraft engine, which may be wing-mounted or fuselage-mounted and the aircraft systems 404 are components, devices, and systems that are located separately from the engine, and thus may be arranged within various locations on a wing, within a fuselage, or otherwise located onboard an aircraft.

The engine systems 402 may include the components shown and described above, including, without limitation, a fan section, a compressor section, a combustor section, a turbine section, and an exhaust section. In this schematic illustration, without limitation, the engine systems 402 include an engine oil system 406, an air cooling system 408, a burner 410 (e.g., part of a combustion section), an anti-ice system 412, and a generator system 414. Those of skill in the art will appreciate that other systems, components, and devices may be incorporated into the engine system 402, and the illustrative embodiment is merely for explanatory and illustrative purposes. In this illustrative embodiment, a hydrogen high pressure pump 416 and an oil pump 418 are arranged as part of the generator system 414. The generator system 414 further includes a turbo expander 420, an engine-side generator 422, and a hydrogen-air heat exchanger 424. An air turbine starter 426 is provided within the engine system 402. The anti-ice system 412 of the engine systems 402 includes an engine bleed system 428 that is configured to supply warm air to a cowl anti-ice system 430 to prevent ice buildup on an engine cowl.

The aircraft systems 404 include various features installed and present that are separate from but may be operably or otherwise connected to one or more of the engine systems 402. In this illustrative, non-limiting configuration, the aircraft systems 404 include one or more hydrogen tanks 432 configured to store liquid hydrogen onboard the aircraft, such as in tanks that are wing-mounted or arranged within the aircraft fuselage. The aircraft systems 404 include a cabin air cooling system 434, a wing anti-ice system 436, flight controls 438, one or more aircraft-side generators 440, and aircraft power systems 442.

The schematic diagram in FIG. 4 of the aircraft propulsion system 400 illustrates flow paths for different working fluids. For example, a hydrogen flow path 444 represents a flow path of liquid (or gaseous) hydrogen from the hydrogen tanks 432 to the burner 410. One or more air flow paths 446 represent airflow used for cooling and heat exchange with the hydrogen, and thus one or more heat exchangers or exchange systems may be provided to enable heat transfer from the air to the hydrogen, to cool the air and warm the hydrogen. A hydraulic fluid flow path 448 is illustrated fluidly connecting a hydraulic pump 450 to the flight controls 438. An electrical path 452 illustrates power generated by the generators 422, 440 and distribution of such power (e.g., from generators 422, 440 to aircraft power systems 442 and other electrical systems onboard an aircraft). As shown, one or more of the paths 444, 446, 448, 452 may cross between the engine systems 402 and the aircraft systems 404.

Referring to the hydrogen flow path 444, liquid hydrogen may be sourced or supplied from the hydrogen tanks 432. One or more pumps 454 may be arranged to boost a pressure of the hydrogen as it is supplied from the hydrogen tanks 432. In some configurations, the pumps 454 may be low pressure pumps, providing an increase in pressure of about 20 psid to 50 psid, for example. The hydrogen may be supplied to one or more combustion systems. For example, a portion of the hydrogen may be supplied to an auxiliary power source 456, such as an auxiliary power unit having a hydrogen burner or a hydrogen-based fuel cell. The auxiliary power source 456 may be part of the aircraft systems 404 and may be configured to direct air to the air turbine starter 426 along a section of an air flow path 446. Further, the auxiliary power source 456 may be configured to generate power at the generator 440 to supply power to the aircraft power system 442, the hydraulic pump 450, and/or the cabin air cooling system 434 and other ECS systems or other onboard electrically powered systems of the aircraft.

For propulsion onboard the aircraft, a portion of the hydrogen may be supplied from the hydrogen tanks 432 along the hydrogen flow path 444 to an aircraft-systems heat exchanger 458 which may include a hydrogen-air heat exchanger to cool air. The aircraft-systems heat exchanger 458 may be part of the aircraft systems 404. One or more low pressure pumps 454 may be arranged to boost a pressure of the hydrogen and thus heat the hydrogen before entering the aircraft-systems heat exchanger 458. In some embodiments, the aircraft-systems heat exchanger 458 may be part of an environmental control system (ECS) of the aircraft. The cooled air may be supplied, for example, to the cabin air cooling system 434. As this air is cooled, the hydrogen will be warmed within the aircraft-systems heat exchanger 458. The warmed hydrogen may then be passed from the aircraft system 404 to the engine systems 402. As shown, the hydrogen may flow through a portion of the hydrogen flow path 444 to the hydrogen high pressure pump 416. The hydrogen high pressure pump 416 is configured to increase the pressure of the warmed hydrogen to maintain a pressure above a combustor pressure and/or above a critical pressure in order to avoid a phase change to gas in the plumbing, piping, flow path, or heat exchangers, for example.

The boosted pressure hydrogen may then be conveyed to a second heat exchanger. In this configuration, the second heat exchanger is the hydrogen-air heat exchanger 424 of the generator system 414. The second heat exchanger 424 of this embodiment may be a hydrogen-air heat exchanger arranged proximate an exit or nozzle of the engine systems 402 (e.g., exhaust air heat exchanger). In the second heat exchanger 424, the temperature of the hydrogen is further raised. Next, the hydrogen may be passed through the turbo expander 420 of the generator system 414. As the hydrogen is expanded through the turbo expander 420, a turbine may be driven to generate power at the engine-side generator 422. In one non-limiting example, the aircraft-side generator 440 may be configured to generate about 120 kw whereas the engine-side generator 422 may be configured to generate about 300 kw at cruise and about 1000 kw at takeoff. That is, in accordance with some embodiments of the present disclosure, the engine-side generator 422 may be configured to generate more power than the aircraft-side generator 440. The expanded hydrogen may then be directed into (e.g., injected) the burner 410, with such supply of hydrogen to the burner 410 controlled by a valve 460. In some embodiments, and as shown, an electric compressor actuator 462 may be included within the engine systems 402. The electric compressor actuator 462 may be configured to boost a pressure of the hydrogen prior to injection into the burner 410.

The engine systems 402 may further include one or more heat exchangers 464, 466 configured to provide heat exchange onboard the engine. These additional heat exchangers may not be part of the hydrogen flow path 444. For example, an air-oil heat exchanger 464 and an air-air heat exchanger 466 may be arranged for appropriate cooling (or heating) as will be appreciated by those of skill in the art. In some non-limiting embodiments, a post-expander hydrogen-air heat exchanger 468 may be arranged between the turbo expander 420 and the burner 410 and may be used for cooled cooling air, for example.

Using the architecture illustrated in FIG. 4, and in accordance with embodiments of the present disclosure, the hydrogen may be used as a heat sink to provide increased cooling capacity as compared to other cooling schemes. For example, using liquid or supercritical hydrogen can, in some configurations, provide up to ten times the cooling capacity of prior systems. The hydrogen may be used at various locations along the hydrogen flow path 444 to provide cooling to one or more systems, as noted above. For example, the hydrogen can provide cooling to onboard electronics, generators, air for cooling purposes, etc. The pumps 416, 454 act to increase the temperature of the hydrogen. Use of low pressure pumps (e.g., pumps 454) can allow cooling of cooler heat sources (e.g., onboard electronics) whereas a high pressure pump (e.g., pump 416) can be used to boost the pressure of the hydrogen prior to passing through the hydrogen-air heat exchanger 424 and into the turbo expander 420. Further, because the hydrogen is low temperature at the aircraft-systems heat exchanger 458, the hydrogen may act as an efficient heat sink for air. As such, the cabin air conditioning system 434 and other aspects of onboard ECS can be reduced in size, weight, and complexity.

In operation, the hydrogen high pressure pump 416, the hydrogen-air heat exchanger 424, and the turbo expander 420 may be configured to employ the full heat capacity of the hydrogen. For example, the hydrogen may be heated to, but not exceed, an auto-ignition temperature. To achieve this, the hydrogen high pressure pump 416 and the hydrogen-air heat exchanger 424 of the generator system 414 may be sized and configured to increase the temperature of the hydrogen such that it is near the auto-ignition temperature as it passes through the turbo expander 420. The increased pressure and temperature of the hydrogen results in an overheated and/or over pressurized hydrogen that is passed into the turbo expander 420. As such, the engine-side generator 422 may extract the most work from the hydrogen and generate electrical power within the engine systems 402.

Figure 5:
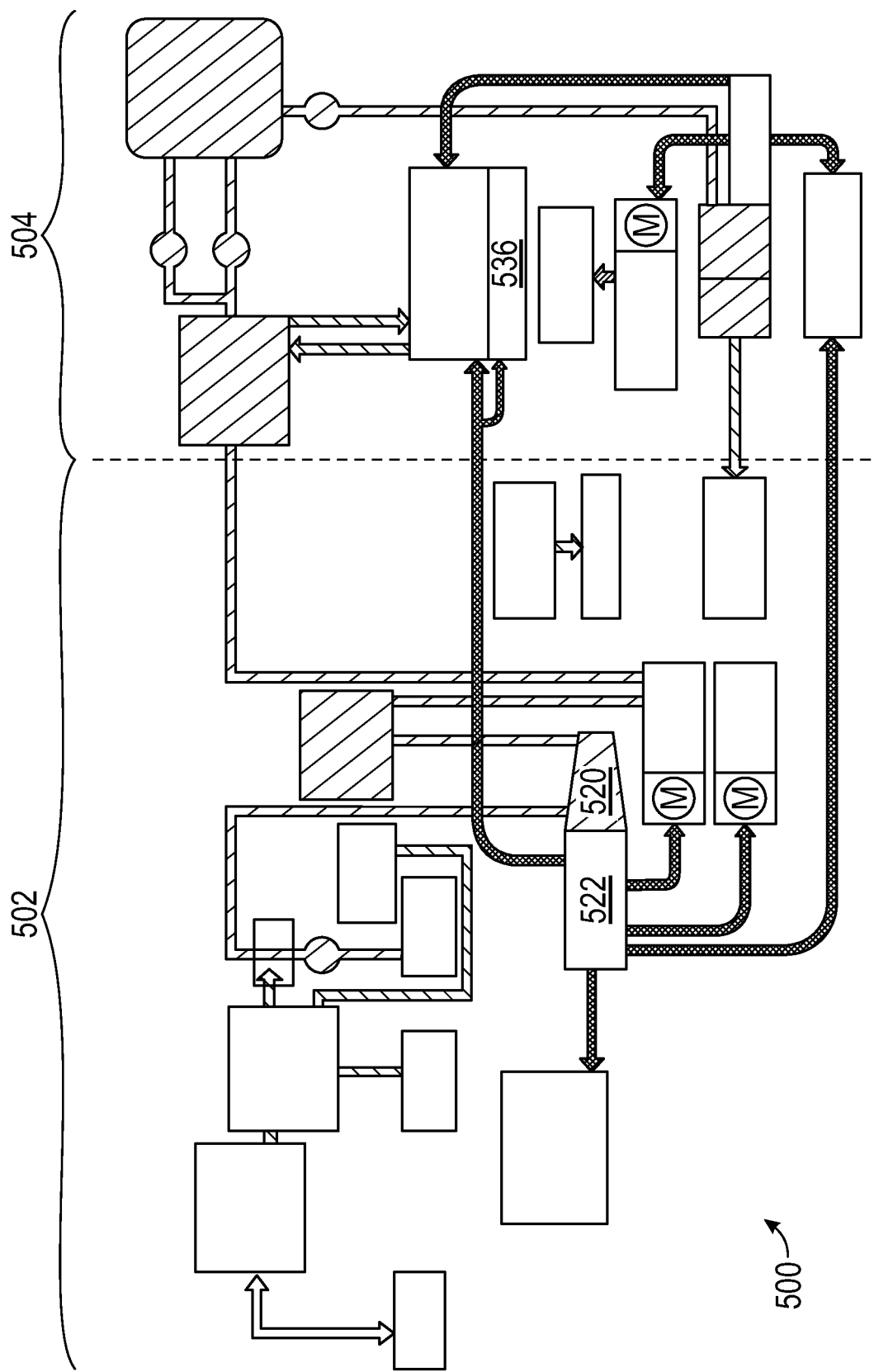
FIG. 5 is a schematic diagram of an aircraft propulsion system in accordance with an embodiment of the present disclosure.

Turning now to FIG. 5, a schematic diagram of an aircraft propulsion system 500 is shown. The aircraft propulsion system 500 includes engine systems 502 and aircraft systems 504. In accordance with embodiments of the present disclosure, the engine systems 502 include components, devices, and systems that are part of an aircraft engine, which may be wing-mounted or fuselage-mounted and the aircraft systems 504 are components, devices, and systems that are located separately from the engine, and thus may be arranged within various locations on a wing, within a fuselage, or otherwise located onboard an aircraft. The configuration of the aircraft propulsion system 500 is substantially similar to that shown and described with respect to FIG. 4, and thus a detailed discussion of the components will be omitted for brevity.

However, in the aircraft propulsion system 500 of FIG. 5, the primary difference between the aircraft propulsion system 400 and the aircraft propulsion system 500 is the configuration of a wing anti-ice 536. In the embodiment of FIG. 4, the engine bleed system 428 is configured to supply warm air to the wing anti-ice system 436 to prevent ice buildup on the wings of an aircraft. In contrast, in the configuration of FIG. 5, an engine-side generator 522 that is driven by turbo expander 520 is used to electrically power the wing anti-ice system 536. In such configurations, rather than using warm air, electrically powered anti-ice systems may be employed. It will be appreciated that such power from the engine-side generator 522 may also be used to power electrical heaters and/or de-icers for other onboard components (e.g., cowl anti-ice) or any other aircraft-side electric or electronic loads.

Figure 6:
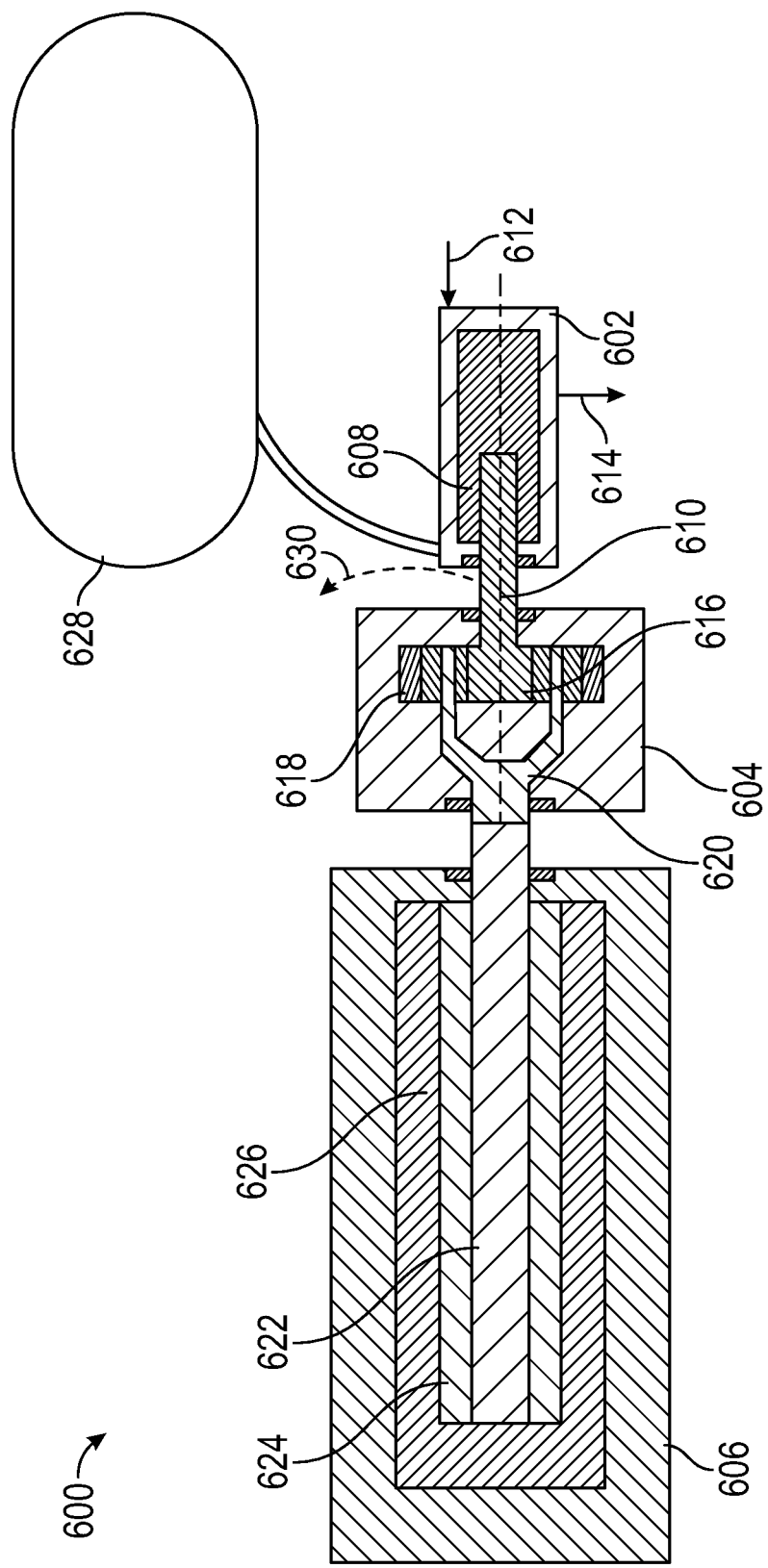
FIG. 6 is a schematic diagram of a generator system in accordance with an embodiment of the present disclosure.

Turning now to FIG. 6, a schematic diagram of a generator system 600 for use with systems of the present disclosure is shown. The generator system 600 may be configured to generate power through the expansion of a cryogenic fluid through a turbo expander. The generator system 600 may be used, for example, in the systems of FIGS. 3-5. As shown in FIG. 6, the generator system 600 includes a turbo expander 602, a gear box 604, and a generator 606. The turbo expander 602 is configured to receive heated and compressed fluid (e.g., gaseous or supercritical) hydrogen from the hydrogen tanks) which is passed through the turbo expander 602 to drive rotation of one or more turbine rotors 608 of the turbo expander 602. The turbine rotors 608 are operably coupled to an output rotor shaft 610 that provides an output of the turbo expander 602. A fluid input 612 is arranged to supply the fuel to an input or inlet of the turbo expander 602 and a fluid output 614 is configured to direct the expanded (e.g., cooler/lower pressure) fluid to downstream components, such as heat exchangers and/or a burner for consumption of the fuel (such as shown and described above).

The output rotor shaft 610 is operably coupled to the gear box 604 at an input side 616 of the gear box 604. A gear system 618 of the gear box 604 enables a change in rotational speed to be output from an output side 620 of the gear box 604. An input rotor shaft 622 is operably coupled to the gear box 604 at the output side 620 of the gear box 604. In some embodiments, and without limitation, the gear box 604 may be configured with a 4:1 gearing ratio. It will be appreciated that other gearing ratios may be employed without departing from the scope of the present disclosure. The input rotor shaft 622 is operably coupled to a rotor system 624 of the generator 606. The rotor system 624 may include magnets, permanent magnets, or the like, which are rotationally driven relative to a stator system 626 of the generator 606. The generator 606 may thus generate electrical power for use onboard an aircraft, for example as described above. In some embodiments, the generator 606 may be configured to generate 1 MW of electrical power or greater.

As shown in FIG. 6, the generator system 600 may include a secondary tank 628. The secondary tank 628 may contain a secondary fluid that can be used for seal buffering and/or starting of the turbo expander 602. For example, the secondary tank 628 may be configured to contain gaseous hydrogen ($GH_2$) held at relatively high pressure (e.g., about 2,000 psi). As the fluid from the secondary tank 628 may be the same as the primary fuel (e.g., supplied at fluid input 612), mixing of these two fluids is permitted and such $GH_2$ from the secondary tank 628 may be integrated into the flow of the primary flow path and expanded and then consumed in a burner or other consumption device (e.g., fuel cell). As such, leaked fluid 630 from the secondary tank 628 is permissible without negatively impacting the operation of the generator system 600 or of other parts of an aircraft propulsion system in which the generator system 600 is used. In other embodiments, a portion of the fuel ($LH_2$) from the main tanks may be extracted and directed for purposes of startup and/or seal buffering, and thus the secondary tank 628 may be omitted.

Figure 7:
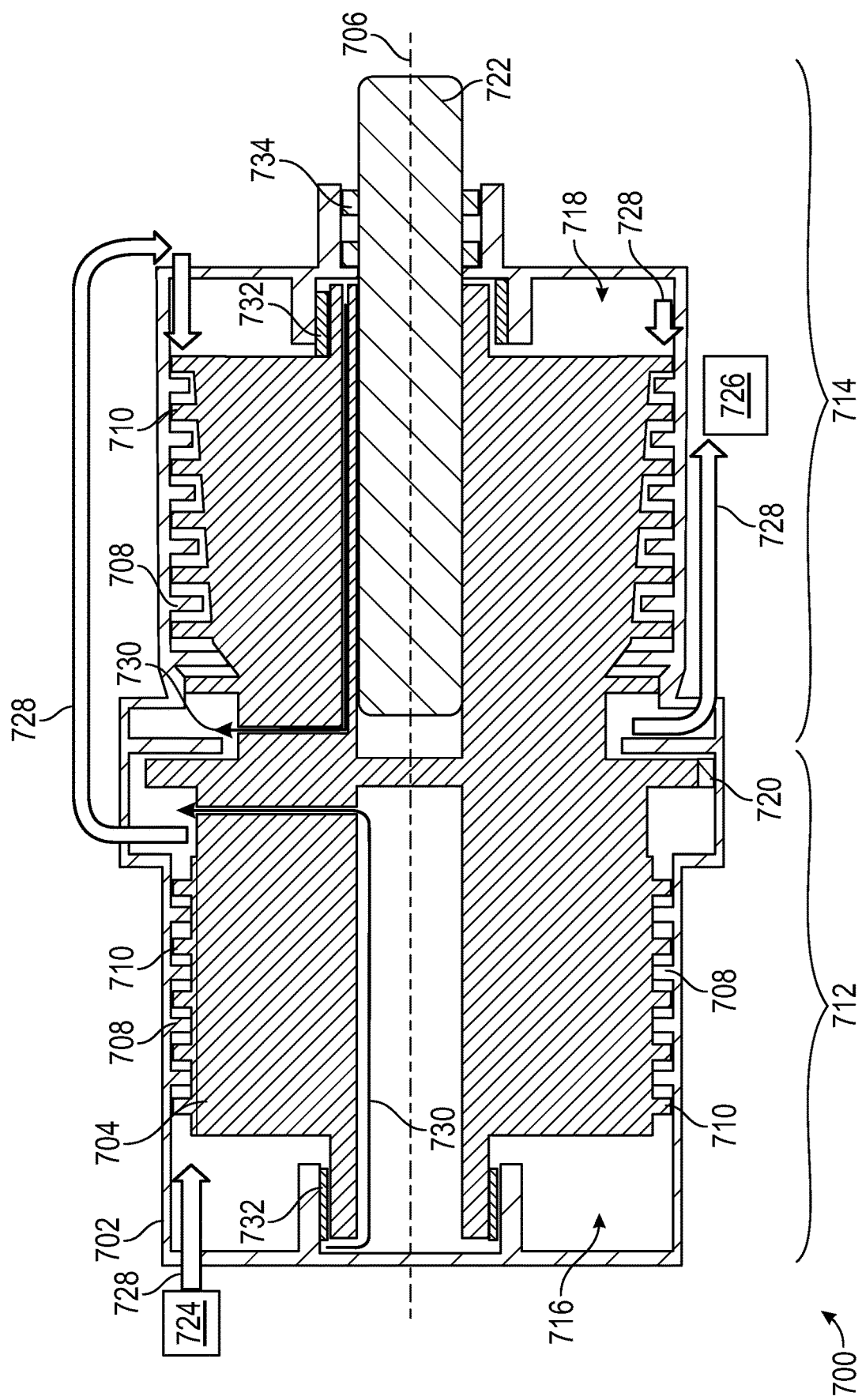
FIG. 7 is a schematic diagram of a turbo expander of a generator system in accordance with an embodiment of the present disclosure.

Turning now to FIG. 7, a schematic illustration of a turbo expander 700 for use in generator systems of the present disclosure is shown. The turbo expander 700 is configured to receive a fluid (e.g., hydrogen from a cryogenic fuel tank) and expand the fluid while having one or more rotors of the turbo expander 700 rotationally driven by the expanding fluid. The turbo expander 700 may be used with the systems shown and described herein or in other systems that may require a turbo expander.

The turbo expander 700 includes a stationary portion 702 and a rotor 704. The stationary portion 702 may be configured as a housing having various ports, openings, and the like, and is arranged along a shaft axis 706. The stationary portion 702 includes a plurality of vanes 708 that are arranged relative to blades 710 that are part of the rotor 704. The turbo expander 700, in this embodiment, is divided into a first expander portion 712 and a second expander portion 714. The first expander portion 712 defines a first cavity 716 within the stationary portion 702 and the second expander portion 714 defines a second cavity 718 within the stationary portion 702. The first cavity 716 may be fluidly separate from the second cavity 718. Such fluid separation may be achieved using one or more fluid seals 720 arranged to prevent fluid from passing between the first and second cavities 716, 718. The two expander portions 712, 714 are arranged in opposition in order to provide partial cancelation of the axial thrust load of the turbo expander, thereby reducing the size of the required thrust bearing. In a typical engine, this is accomplished with a compressor pulling forward to partially counteract the turbine pulling aft. However, because only a turbine is present (i.e., turbo expander), the multiple stages of the turbine are leverage such that they are run in opposite thrust directions to accomplish a similar effect. That is, in accordance with some embodiments, a flow through the first expander portion 712 may be in a first direction (e.g., left to right on the page) and a flow through the second expander portion 714 may be in a second direction opposite the first direction n (e.g., right to left on the page).

Rotation of the rotor 704 drives rotation of an output shaft 722. The output shaft 722 may be operably connected to a generator. Such connection between the output shaft 722 and the generator may be through a gear box or the like.

In operation, the turbo expander 700 is configured to receive a working fluid (e.g., hydrogen) at a fluid inlet 724. The working fluid flows from the fluid inlet 724 to a fluid outlet 726 along a primary flow path 728, with the fluid being expanded within the turbo expander 700 as it passes along or through the vanes 708 and blades 710. As the working fluid passes along the primary flow path 728 the fluid will interact with the blades 710 to drive rotation of the rotor 704 and in turn drive rotation of the output shaft 722. Further, as the working fluid passes through the turbo expander 700, the working fluid will be expanded from the fluid inlet 724 to the fluid outlet 726. As shown, a portion of the working fluid may flow along a secondary flow path 730. The portion of the working fluid that flows along the secondary flow path 730 can provide lubrication to one or more bearings 732 of the turbo expander 700. In some embodiments, the bearings 732 may be journal bearings. The turbo expander 700 may also include buffer seals 734 configured to prevent leaks of the working fluid about the output shaft 722. In some embodiments, the buffer seals 734 may be supplied with a high pressure gaseous hydrogen from a separate or dedicated tank. By selecting a fluid for the buffer seals 734 that is the same as the working fluid of the turbo expander 700, bleed from the buffer seals 734 will not negatively impact operation of the turbo expander 700 or other components downstream from the turbo expander 700.

In this non-limiting example embodiment, the first expander portion 712 includes five (5) blade rows on the rotor 704. Further, in this example embodiment, the second expander portion 714 includes seven (7) blade rows on the rotor 704. As a result, the turbo expander 700 of FIG. 7 is a twelve (12) stage turbo expander. Although a specific expander configuration is illustrated, those of skill in the art will appreciate that the teachings herein may be applicable to other configurations. For example, the number of stages of a turbo expander in accordance with some embodiments may be greater (e.g., 13 stage, 15 stage, etc.) or lesser (e.g., 10 stage, 11 stage, etc.) than the illustrative embodiment, and such embodiment is not intended to be limiting. In some embodiments, the size of each subsequent blade row (or the blades thereof) as compared to a blade row upstream along the primary flow path 728 may increase in length, thus defining an increased area or volume through which the working fluid is expanded. In some embodiments, groups of blades arranged as blade rows 710 may be the same dimension. For example, in FIG. 7, the blades of blade rows 710 of the first expander portion 712 may all be substantially similar in dimension (e.g., length, size). However, the blades of blade rows 710 of the second expander portion 714 may increase in length, as illustratively shown, such that the cross-sectional area that the working fluid passes through along the primary flow path 728 through the second expander portion 714 increases toward the fluid outlet 726.

In one non-limiting example of operation of the turbo expander 700, the working fluid may enter the turbo expander 700 at the fluid inlet 724 having a pressure of about 3500 psi and a temperature of about 950° F. As the working fluid passes through the turbo expander 700, the pressure and temperature will decrease. For example, in this non-limiting example, the working fluid at the fluid outlet 724 may have a pressure of about 650 psi and a temperature of about 500° F. It will be appreciated that the temperature and pressure changes may be selected based on the specific configuration of the turbo expander in use. For example, the number of blades, blade rows, and vanes or other features of the turbo expander may be selected to achieve a desired output temperature and/or pressure.

Figure 8:
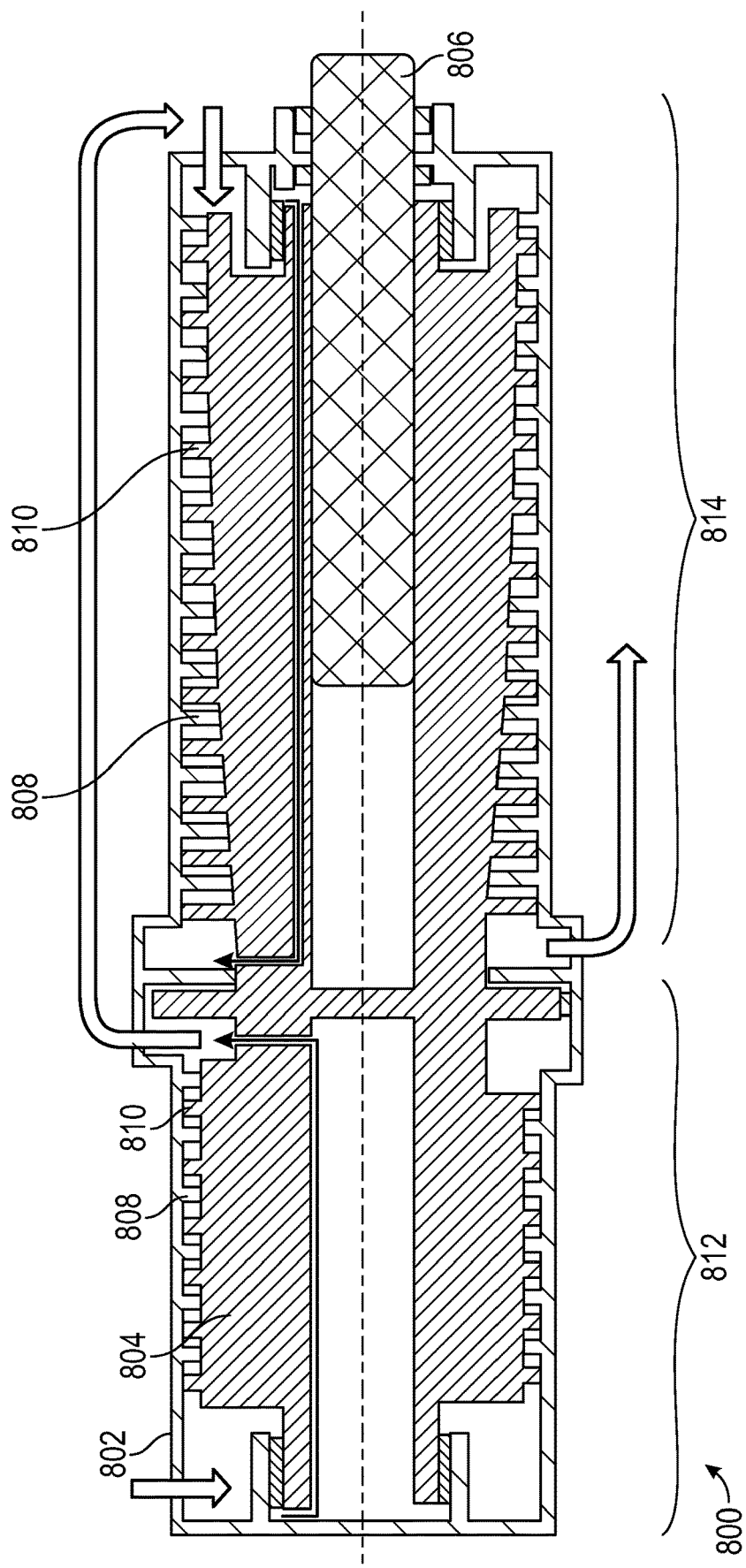
FIG. 8 is a schematic diagram of a turbo expander of a generator system in accordance with an embodiment of the present disclosure.

Turning now to FIG. 8, a schematic illustration of a turbo expander 800 for use in generator systems of the present disclosure is shown. The turbo expander 800 is configured to receive a fluid (e.g., hydrogen from a cryogenic fuel tank) and expand the fluid while having one or more rotors of the turbo expander 800 rotationally driven by the expanding fluid. The turbo expander 800 may be used with the systems shown and described herein or in other systems that may require a turbo expander. The turbo expander 800 includes components arranged similar to that shown and described with respect to turbo expander 700 of FIG. 7, and thus a detailed description of such components will not be repeated.

The turbo expander 800 includes a stationary portion 802 and a rotor 804. The stationary portion 802 may be configured as a housing having various ports, openings, and the like, and is arranged about an output shaft 806 that is operably coupled to the rotor 804. As such, the output shaft 806 may be rotationally driven by rotation of the rotor 804. Similar to that described above, the output shaft 806 may be operably coupled to a generator to generate electrical power. The stationary portion 802 includes a plurality of vanes 808 that are arranged relative to blades of blade rows 810 that are part of the rotor 804. The turbo expander 800, in this embodiment, is divided into a first expander portion 812 and a second expander portion 814, as described above.

In this embodiment, the turbo expander 800 is an eighteen (18) stage turbo expander. In the first expander portion 812, the rotor 804 includes six (6) blade rows 810 arranged relative to six (6) vanes 808. Each of the blade rows 810 of the first expander portion 812 may be substantially similar in size. When the working fluid enters the second expander portion 814 it will pass through a set of twelve (12) blade rows 810 and vanes 808 that have increasing dimension such that the cross-sectional area or volume through which the working fluid is passed increases. In one non-limiting example of operation of the turbo expander 800, the working fluid may enter the first expander portion 812 having a pressure of about 4000 psi and a temperature of about 950° F. As the working fluid passes through the second expander portion 814, the working fluid will be expanded to decrease the pressure to about 650 psi and the temperature down to about 500° F.

It will be appreciated that turbo expanders of the present disclosure may include any number of blades/blade rows/vanes in each of the first and second expander portions. In each of the above described turbo expanders 700, 800, and variations thereof, the expander portions may be configured to receive the working fluid as an axial inflow (e.g., as shown in FIGS. 7-8) or as a radial inflow (e.g., normal or radial relative to the shaft axis through the turbo expander). A radial inflow may enable a peak efficiency at the rim speed that is approximately equal to the gas speed, resulting in a relatively high RPM. Such radial inflow may be less sensitive to clearances of the blades relative to the stationary portion. Additionally, the radial inflow configuration can result in a higher pressure per stage, thus reducing the number of blades/blade rows/vanes in the configuration. In contrast, an axial inflow can result in peak efficiency at a rim speed that is approximately half the gas speed, resulting in lower RPM. Such a configuration is more sensitive to clearances as compared to radial inflow configurations and may have a lower pressure per stage, requiring a higher stage count compared to radial configurations.

Figure 9:
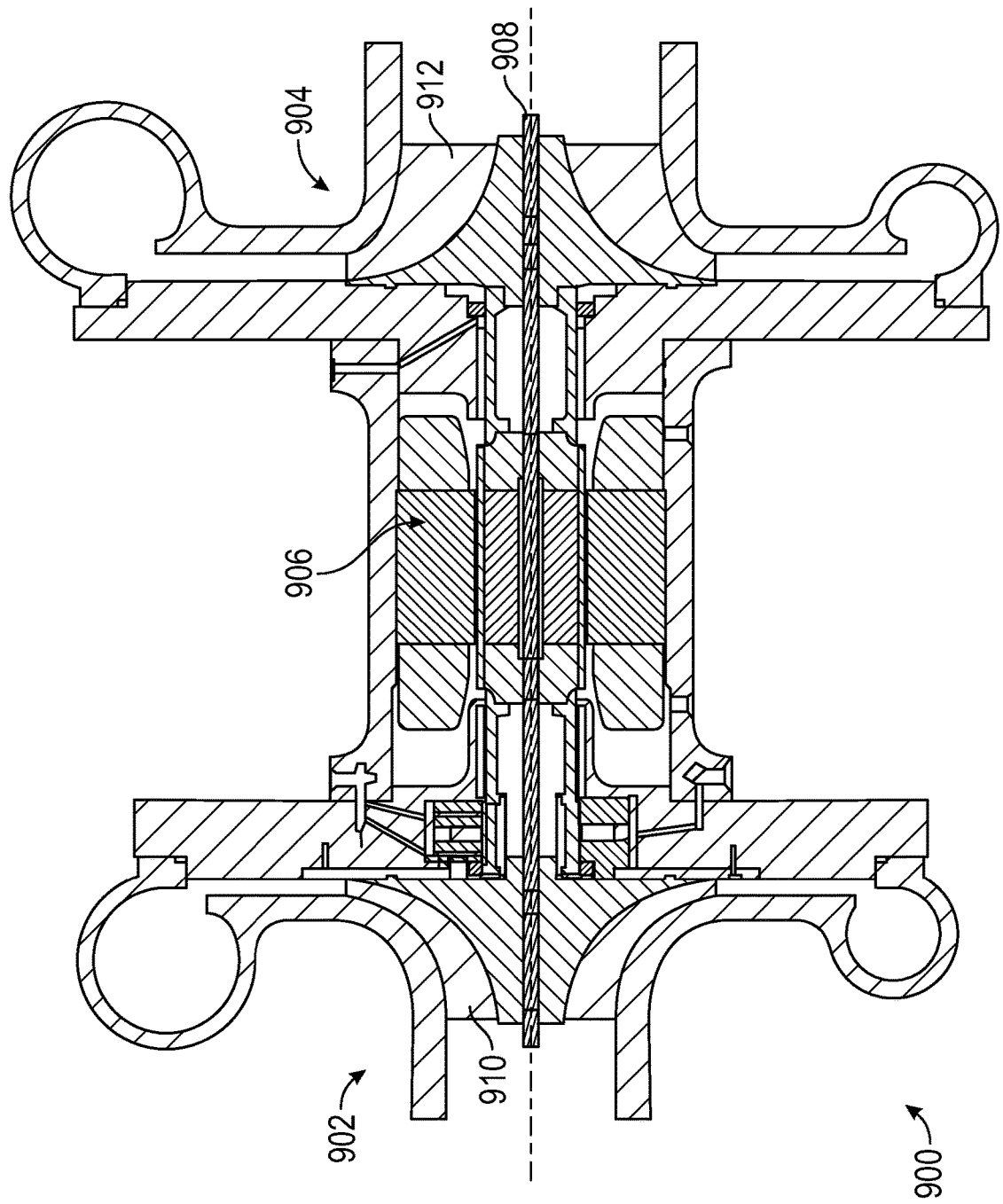
FIG. 9 is a schematic diagram of a turbo expander of a generator system in accordance with an embodiment of the present disclosure.

Turning now to FIG. 9, a radial inflow turbo expander 900 configuration in accordance with an embodiment of the present disclosure is shown. The turbo expander 900 includes a first expander portion 902 and a second expander portion 904, each arranged as radial inflow expanders. In this embodiment, a generator 906 is arranged between the first expander portion 902 and the second expander portion 904 along a drive shaft 908 (or output shaft). In this configuration, blades 910 of the first expander portion 902 may be smaller than the blades 912 of the second expander portion 904, resulting in increased volume or cross-sectional area for the working fluid, similar to that described above.

Advantageously, embodiments of the present disclosure are directed to improved turbine engine systems that employ non-hydrocarbon fuels at cryogenic temperatures. In accordance with some embodiments, the systems described herein provide for a hydrogen-burning turbine engine that may include a generator that is driven using a turbo expander that is arranged along a fuel flow path from a cryogenic fuel source to a burner or other consumption device (e.g., fuel cell). The turbo expander may be configured as a multi-stage, multi-portion expander that extracts work from the fuel or working fluid, while reducing the pressure and temperature of the working fluid, for example.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft propulsion system, comprising:
   aircraft systems comprising at least one hydrogen tank and an aircraft-systems heat exchanger; and
   engine systems comprising at least a main engine core, a high pressure pump, a hydrogen-air heat exchanger, and a turbo expander, wherein the main engine core comprises a compressor section, a combustor section having a burner, and a turbine section;
   wherein hydrogen is supplied from the at least one hydrogen tank through a hydrogen flow path, passing through the aircraft-systems heat exchanger, the high pressure pump, the hydrogen-air heat exchanger, and the turbo expander, prior to being injected into the burner for combustion,
   wherein the turbo expander comprises a rotor separated into a first expander portion and a second expander portion arranged about an output shaft, and
   wherein the output shaft is operably connected to a generator configured to generate electrical power, and
   a secondary tank configured to contain a secondary fluid that is supplied to the turbo expander and configured to provide at least one of seal buffering and a starting flow for the turbo expander.

2. The aircraft propulsion system of claim 1, wherein the first expander portion of the rotor includes at least five blade rows and the second expander portion of the rotor includes at least seven blade rows.

3. The aircraft propulsion system of claim 1, further comprising a gear box operably coupled between the output shaft and the generator.

4. The aircraft propulsion system of claim 1, wherein the generator is configured to generate at least 1 MW of electrical power.

5. The aircraft propulsion system of claim 1, wherein the secondary tank contains high pressure gaseous hydrogen.

6. The aircraft propulsion system of claim 1, wherein electrical power from the generator is supplied to a wing anti-ice system.

7. The aircraft propulsion system of claim 1, wherein the turbo expander is a radial inflow turbo expander.

8. The aircraft propulsion system of claim 1, wherein the turbo expander is an axial inflow turbo expander.

9. The aircraft propulsion system of claim 1, wherein a flow through the first expander portion is in a first direction and a flow through the second expander portion is in a second direction opposite the flow through the first expander portion.

10. An aircraft comprising:
    a main engine core having a compressor section, a combustor section having a burner, a turbine section, and a turbo expander;
    aircraft systems comprising at least one hydrogen tank and an aircraft-systems heat exchanger arranged remote from the main engine core;
    wherein hydrogen is supplied from the at least one hydrogen tank through a hydrogen flow path, passing through the aircraft-systems heat exchanger and the turbo expander prior to being injected into the burner for combustion,
    wherein the turbo expander comprises a rotor separated into a first expander portion and a second expander portion arranged about an output shaft, and
    wherein the output shaft is operably connected to a generator configured to generate electrical power, and
    a secondary tank configured to contain a secondary fluid that is supplied to the turbo expander and configured to provide at least one of seal buffering and a starting flow for the turbo expander.

11. The aircraft of claim 10, further comprising a gear box operably coupled between the output shaft and the generator.

12. The aircraft of claim 10, wherein the generator is configured to generate at least 1 MW of electrical power.

13. The aircraft of claim 10, wherein the secondary tank contains high pressure gaseous hydrogen.

14. The aircraft of claim 10, wherein electrical power from the generator is supplied to a wing anti-ice system of the aircraft.

15. The aircraft of claim 10, wherein the turbo expander is a radial inflow turbo expander.

16. The aircraft of claim 10, wherein the turbo expander is an axial inflow turbo expander.

17. The aircraft of claim 10, wherein a flow through the first expander portion is in a first direction and a flow through the second expander portion is in a second direction opposite the flow through the first expander portion.

18. The aircraft of claim 10, wherein the first expander portion of the rotor includes at least five blade rows and the second expander portion of the rotor includes at least seven blades rows.

19. An aircraft propulsion system, comprising:
aircraft systems comprising at least one hydrogen tank and an aircraft-systems heat exchanger; and
engine systems comprising at least a main engine core, a high pressure pump, a hydrogen-air heat exchanger, and a turbo expander, wherein the main engine core comprises a compressor section, a combustor section having a burner, and a turbine section;
wherein hydrogen is supplied from the at least one hydrogen tank through a hydrogen flow path, passing through the aircraft-systems heat exchanger, the high pressure pump, the hydrogen-air heat exchanger, and the turbo expander, prior to being injected into the burner for combustion,
wherein the turbo expander comprises a rotor separated into a first expander portion and a second expander portion arranged about an output shaft,
wherein the output shaft is operably connected to a generator configured to generate electrical power, and
wherein a flow through the first expander portion is in a first direction and a flow through the second expander portion is in a second direction opposite the flow through the first expander portion.

20. An aircraft comprising:
a main engine core having a compressor section, a combustor section having a burner, a turbine section, and a turbo expander;
aircraft systems comprising at least one hydrogen tank and an aircraft-systems heat exchanger arranged remote from the main engine core;
wherein hydrogen is supplied from the at least one hydrogen tank through a hydrogen flow path, passing through the aircraft-systems heat exchanger and the turbo expander prior to being injected into the burner for combustion,
wherein the turbo expander comprises a rotor separated into a first expander portion and a second expander portion arranged about an output shaft,
wherein the output shaft is operably connected to a generator configured to generate electrical power, and
wherein a flow through the first expander portion is in a first direction and a flow through the second expander portion is in a second direction opposite the flow through the first expander portion.

\* \* \* \* \*